United States Patent Office 2,927,131
Patented Mar. 1, 1960

2,927,131

IMPROVED PROCESS FOR PREPARATION OF THIO- AND DITHIOSULFENYL HALIDE DERIVATIVES

Rector P. Louthan, Bartlesville, Okla., assignor to Phillips Petroleum Company, a corporation of Delaware No Drawing. Application September 16, 1955
Serial No. 534,889

5 Claims. (Cl. 260—551)

This invention relates to the preparation of derivatives of organic thiosulfenyl and dithiosulfenyl halides. In one aspect this invention relates to a modus operandi in accordance with which a sulfur halide, a mercaptan, and a compound reactive with thiosulfenyl and dithiosulfenyl halides are reacted to produce derivatives of such halides in improved high yield. In another aspect this invention relates to production of a preferred group of derivatives which are produced from thiosulfenyl halides, or dithiosulfenyl halides and xanthates, dithiocarbamates, thiocyanates, sulfenamides, and thiocarbonates in improved high yield, by reacting a mercaptan, a hydroxide, a sulfur halide and at least one of a xanthate, dithiocarbamate, cyanide, primary or secondary amine, and thiocarbonate, wherein the sulfur halide is always a last-added reactant.

The preparation of organic thiosulfenyl halides and dithiosulfenyl halides is known as well as the reaction of the resulting halide product with a reactant which is reactive with the said halide, such as a xanthate, dithiocarbamate, cyanide, primary amine, secondary amine, or a thiocarbonate, to form a corresponding derivative product.

I have discovered that derivatives of organic thiosulfenyl halides and dithiosulfenyl halides, such as above described, can be formed in improved high yield by employing a specific modus operandi wherein a sulfur halide reactant is always a last-added reactant, either alone or concurrently with another reactant.

An object of this invention is to provide for a preparation of derivatives of organic thiosulfenyl halides and dithiosulfenyl halides in improved high yield. Another object is to provide a modus operandi by which a mercaptan, a sulfur halide, and a compound reactive with an organic thiosulfenyl halide and/or a dithiosulfenyl halide are reacted to produce derivatives of such organic halides, in improved high yield. Another object is to provide for production in improved high yield of a preferred group of derivatives from organic thiosulfenyl halides or dithiosulfenyl halides, and dithiocarbamates, thiocarbonates, sulfenamides, thiocyanates, and xanthates. Other aspects and objects of this invention and its several related particulars are evident from a perusal of this disclosure, and the appended claims.

In accordance with this invention, derivatives of organic thiosulfenyl and dithiosulfenyl halides are prepared in improved high yield by reacting a mercaptan, RSH, a hydroxide, a sulfur halide, and a compound reactive with an organic halide of the formula $RS_nX$, wherein $n$ is a whole integer of the group of 2 and 3, X is a halogen, and R in each of the foregoing formulas is one of the group of a saturated acyclic, saturated alicyclic and aryl radicals, to form a mercaptide and to react said mercaptide with remaining reactants to form said derivative, the sulfur halide reactant being a last-added reactant in the derivative-forming reaction mixture; a now preferred concept comprising reacting the mercaptan reactant with an inorganic hydroxide to form a mercaptide, and simultaneously reacting the said mercaptide, the sulfur halide and remaining reactant, such as by adding to two latter reactants to the mercaptide-containing reaction mixture together, or effecting reaction of the said mercapide by adding the mercaptide-containing reaction mixture to the reactant compound above described prior to addition of the sulfur halide, or adding the said reactant compound to the mercaptide-containing admixture with subsequent sulfur halide addition.

Each R in the above formulas contains, preferably, from 1 to 20 carbon atoms.

It is an important feature of the modus operandi of this invention that, although any combination of steps for forming the mercaptide and reacting the mercaptide with the said reactant compound may be utilized, the sulfur halide reactant in no case is added to either of the other reactants before the remaining reactant is introduced into the reaction zone. Thus, in all events, the sulfur halide reactant is a last-added reactant.

The overall reaction of this invention is conducted preferably in liquid phase at any suitable pressure therefor, and advantageously at a temperature in the range of about —45 to 200° C. It is carried out either in presence or in absence of a solvent chemically inert to reactants and product, as desired. However, the overall reaction is slightly exothermic and in some cases the use of a solvent, under refluxing conditions, is advantageous as means for removing the heat formed by exothermic reaction.

Exemplary of inert solvents that can be employed in the practice of this invention are carbon tetrachloride, n-pentane, benzene, Soltrol, which is a high boiling isoparaffinic hydrocarbon prepared by the alkylation of olefins with paraffins in the presence of sulfuric or hydrofluoric acid as catalyst, isooctane, n-decane and isododecane.

Inert solvents having a boiling range within the limits of about 40 to 400° F. are preferred in the practice of this invention.

Although reaction time is dependent upon the specific reactants employed and can be ascertained by one skilled in the art in light of this disclosure, the overall reaction time is often in the range of from 5 to 60 minutes, of which from 10 to 20 minutes is generally required in effecting reaction to produce a mercaptide, when a mercaptide is formed in absence of other reactants and the remainder for effecting reaction involving sulfur halide and remaining reactant.

Exemplary of mercaptan reactants that can be employed are methyl mercaptan, isopropyl mercaptan, tert-butyl mercaptan, phenyl mercaptan, cyclohexyl mercaptan, tert-octyl mercaptan, 2,4,6-trimethylphenyl mercaptan, n-dodecyl mercaptan, n-eicosyl mercaptan, 1-mercapto-2,2-di-tert-butyl-4-n-hexylcyclohexane, p-tolyl mercaptan, benzyl mercaptan, a-methylbenzyl mercaptan, 3-phenyl-n-pentyl mercaptan, 2,5,7-triisopropyl-n-nonyl mercaptan, and tert-dodecyl mercaptan.

Any suitable hydroxide can be employed, alkali metal and alkaline earth metal hydroxides being preferred, e.g., sodium hydroxide, potassium hydroxide, lithium hydroxide, and calcium hydroxide.

Although any sulfur halide can be employed as desired, i.e., sulfur monohalides and/or sulfur dihalides those now preferred are sulfur monochloride and sulfur monobromide. Further exemplary are sulfur dichloride and sulfur dibromide.

Exemplary of reactants referred to hereinabove as reactive with organic thiosulfenyl halides and organic dithiosulfenyl halides are ammonium or metal, preferably ammonium or alkali metal xanthates, dithiocarbamates, trithiocarbonates and cyanides, as for example, sodium ethyl xanthate, potassium methyl xanthate, sodium phenyl xanthate, lithium isopropyl xanthate, rubidium benzyl xanthate, and sodium cyclohexyl xanthate; sodium dithiocarbamate, potassium dimethyldithiocarbamate, lithium di-n-propyldithiocarbamate, sodium di-tert-butyldithiocarbamate, sodium methylethyldithiocarbamate, potassium diphenyldithiocarbamate, and rubidium pentamethylenedithiocarbamate; sodium trithiocarbonate, lithium trithiocarbonate, potassium trithiocarbonate, magnesium trithiocarbonate and calcium trithiocarbonate; sodium cyanide, lithium cyanide, potassium cyanide, cesium cyanide, rubidium cyanide, magnesium cyanide, calcium cyanide, strontium cyanide, and barium cyanide; and primary and/or secondary amines such as dimethylamine, methylamine, ethylamine, benzylamine, diethylamine, methylethylamine, cyclohexylamine, morpholine and piperidine.

Exemplary of derivative products of this invention, i.e., derivatives of organic thiosulfenyl and/or dithiosulfenyl halides are N,N - dimethyl - tert- butyldithiosulfenamide, methyldithiosulfenyl diethyldithiocarbamate, di-(phenyldithiosulfenyl) trithiocarbonate, cyclohexylthiosulfenyl thiocyanate, tert - octyl - dithiosulfenyl ethylxanthate, N,N - di - tert - butyl - n - eicosyldithiosulfenamide, and phenyldithiosulfenyl pentamethylenedithiocarbamate.

Derivatives of organic thiosulfenyl and dithiosulfenyl halides, prepared in accordance with this invention, may be recovered from the resulting reaction mixture by any suitable method, preferably by crystallization or distillation. In recovery of these products by distillation, a distillation pressure, generally in the range of from about 0.05 to 50 mm. Hg is advantageously employed in view of the increasing instability of these compounds at distillation temperatures concomitant with increased distillation pressure. However, higher or lower pressures can be employed in many instances.

In accordance with preferred practice of this invention, a metal hydroxide, preferably an alkali metal hydroxide, such as sodium hydroxide, in from about 5 to 20 weight percent aqueous solution, is charged together with from 0.25 to 2 volumes of a solvent chemically inert under the reaction conditions to be encountered, preferably an n-paraffin hydrocarbon or hydrocarbon fraction containing from 4 to 14 carbon atoms per molecule, per volume of total reactants to be introduced into the reaction system, and the resulting aqueous hydroxide-solvent admixture is maintained at a temperature, with agitation, within a range of about 0 to 250° F., preferably at a refluxing temperature as for example at about atmospheric pressure. From 0.25 to 1.0 mols of mercaptan, for example tert-butyl mercaptan, per mol of hydroxide reactant, is added to the solvent-hydroxide admixture, gradually, over a period of from 1 to 60 minutes. Under these conditions a mercaptide, as, for example, sodium tert-butyl mercaptide is formed.

From about 1 to 2 mols of a compound reactive with an organic thio- or dithiosulfenyl halide, per mol of mercaptide present in the mercaptide-containing mixture, is added to the said mixture, maintained under agitation conditions at a temperature about the same as that of the mercaptide-forming reaction, although any suitable temperature, as within the above-described range, can be employed. Dimethylamine, advantageously as a 10 to 40 weight percent aqueous solution, is a preferred reactant exemplary of that introduced into the mercaptide-containing reaction mixture. A sulfur halide, sulfur monochloride being now preferred, is, as a last-added reactant, added to the resulting reaction mixture, the latter being maintained under agitation conditions at a temperature in the above-described range, advantageously under reflux, the overall reaction requiring about 5 to 60 minutes, i.e., for formation of the final derivative product and, when maintained under reflux, the reaction time being preferably that required for reflux to cease. The mol ratio of sulfur halide to mercaptan reactant is preferably in the range of 0.9:1 to 1:1. An oil product phase is formed, and recovered, and solvent is removed therefrom by distillation after which the oil phase, substantially solvent-free is subjected to vacuum distillation for recovery of derivative product, N,N-dimethyl-tert-butyldithiosulfenamide being formed as chief product when tert-butyl mercaptan, dimethylamine, and sulfur monochloride reactants are utilized.

My invention is illustrated with reference to the following examples, of which Example I serves as a "control" and Example II sets forth a modus operandi of this invention. A comparison of data of the two examples showing increased product yield obtained in accordance with this invention, is included.

*Example I*

N,N - dimethyl - tert - butyldithiosulfenamide was prepared by the following procedure. 135 grams of sulfur monochloride and 750 cc. of n-pentane were charged to a 2-liter, 3-necked flask fitted with a Dry Ice-acetone condenser, stirrer, and dropping funnel. Ninety grams of tert-butyl mercaptan was then added dropwise over a 20 minute period to the vigorously agitated solution of sulfur monochloride in normal pentane. After the reaction was complete, this solution was then added dropwise to a vigorously agitated mixture of 190 grams of 25% by weight aqueous dimethylamine containing 44 grams of sodium hydroxide; after the solution had been added, the phases were separated, the oil phase washed with water, and the majority of the pentane removed by heating to about 85° C. on a steam bath. The stripped oil phase was then distilled at reduced pressure and the products recovered. The yield of products is as follows:

52 grams—Bis(dimethylamino) disulfide
62 grams—N,N-dimethyl-tert-butyldithiosulfenamide
61 grams—di-tert-butyl tetrasulfide An analysis of a redistilled cut of the compound N,N-dimethyl-tert-butyl-dithiosulfenamide revealed a boiling point of 50° C. at 0.05 mm. of mercury absolute pressure and a refractive index of 1.5415 at 20° C. An element analysis gave the following results:

|  | Calculated, Percent | Found [1], Percent |
| --- | --- | --- |
| Carbon | 36.6 | 36.2 |
| Hydrogen | 7.6 | 7.9 |
| Nitrogen | 7.1 | 8.1 |
| Sulfur | 48.7 | 49.3 |

[1] Analysis run individually for each element—total exceeds 100 percent.

*Example II*

The compound N,N-dimethyl-tert-butyldithiosulfenamide was prepared in a run using the method of this invention. Eighty-eight grams of sodium hydroxide, dissolved in 500 cc. of water, and 750 cc. of isopentane were charged to a 2-liter, 3-necked flask equipped with a Dry Ice condenser, dropping funnel and stirrer. Ninety-grams of tert-butyl mercaptan was then added to the flask over a 5 minute period and the mixture was stirred until reflux stopped. One hundred twenty-five grams of 40 weight percent aqueous dimethylamine was then charged to the flask and stirred, followed by a charge of 135 grams of sulfur monochloride. Vigorous agitation was maintained until reflux stopped, at which point the reaction was considered complete. The phases were then separated, the oil phase washed with water and the majority of the isopentane removed by heating to 80° C. on a steam bath. The stripped oil phase was then distilled at reduced pressure to give the following products:

28 grams Bis(dimethylamino)disulfide
98 grams N,N-dimethyl-tert-butyldithiosulfenamide
46 grams di-tert-butyl tetrasulfide In accordance with procedure illustrated with reference to Example I, the mercaptan and sulfur monochloride were reacted to produce the organic dithiochloride followed by reaction of resulting product with dimethylamine, the yield of thiosulfenamide product being 62 grams. However, as shown with reference to Example II, illustrative of this invention, employing the same reactants and the same amounts thereof, when the mercaptide is first formed and sulfur monochloride is added as a last reactant in accordance with this invention, a markedly improved yield of sulfenamide product is obtained, i.e., 98 grams. Thus, the improvement of this invention is illustrated by these examples as shown by way of the following tabulation with reference thereto.

|  | Grams | |
| --- | --- | --- |
|  | Example I | Example II |
| RSH | 90 | 90 |
| $S_2Cl_2$ | 135 | 135 |
| Dimethylamine | 48 | 50 |
| Product [1] yield | 62 | 98 |

[1] N,N-dimethyl-tert-butyldithiosulfenamide.

Dithiosulfenyl dithiocarbamate derivative products of this invention exhibit especial utility as vulcanization accelerators for both natural and synthetic rubber. Dithiosulfenamide and thiosulfenamide derivatives of this invention exhibit utility as additives for mineral lubricating oils, particularly as antioxidants. Thiocarbonate derivative products of this invention exhibit utility as plant defoliants, for example, cotton defoliants. Thiosulfenyl and dithiosulfenyl xanthate products of this invention exhibit utility as plant defoliants, thiosulfenyl xanthates being disclosed as defoliating agents in copending application, Serial No. 373,682, now U.S. 2,846,298, of C. W. Osborn and L. D. Goodhue, filed August 11, 1953. Thio- and dithiocyanate derivative products of this invention exhibit utility as pest control agents, e.g., insecticides and fungicides.

Reasonable variation and modification are possible within the scope of the foregoing disclosure and the appended claims to the invention, the essence of which is that a modus operandi has been provided for reacting a mercaptan, a hydroxide, a sulfur halide, and a material reactive with an organic thiosulfenyl and/or dithiosulfenyl halide to provide derivatives of the last said halide in improved high yield, which comprises introducing the sulfur halide into the reaction mixture as a last-added reactant; a now preferred concept comprising forming a mercaptide by first reacting a mercaptan with an inorganic hydroxide and simultaneously reacting the said mercaptide with the sulfur halide and remaining reactant compound such as by adding the two latter reactants to the mercaptide-containing reaction mixture together; or effecting reaction of the said mercaptide by (1) adding the mercaptide-containing reaction mixture to the reactant compound above described prior to addition of the sulfur halide, or (2) adding the said reactant compound to the mercaptide-containing admixture with subsequent sulfur halide addition.

I claim:
1. In the process wherein a mercaptan having the formula RSH, wherein R contains from 1–20 carbon atoms selected from the group consisting of saturated acyclic, saturated alicyclic and aryl radicals, an aqueous solution of an inorganic hydroxide, an inorganic sulfur halide and a compound reactive with an organic halide of the formula $RS_nX$ wherein $n$ is an integer selected from the group consisting of 2 and 3, X is a halogen, and R is as above defined, said compound reactive with said organic halide being selected from the group consisting of primary amines, secondary amines, metal xanthates, ammonium xanthates, metal and ammonium dithiocarbamates, metal and ammonium thiocarbonates, and metal and ammonium cyanides, are reacted together to form a derivative of said $RS_nX$, the improvement comprising the step of adding said inorganic sulfur halide as a last-added reactant.

2. In the process wherein a mercaptan having the formula RSH, wherein R contains from 1–20 carbon atoms selected from the group consisting of saturated acyclic, saturated alicyclic, and aryl radicals, an aqueous solution of an inorganic hydroxide, an inorganic sulfur halide and a compound reactive with an organic halide of the formula $RS_nX$ wherein $n$ is an integer selected from the group consisting of 2 and 3, X is a halogen, and R is as above defined, said compound reactive with said organic halide being selected from the group consisting of primary amines, secondary amines, metal xanthates, ammonium xanthates, metal and ammonium dithiocarbamates, metal and ammonium thiocarbonates, and metal and ammonium cyanides, are reacted together to form a derivative of said $RS_nX$, the improvement comprising the steps of first reacting said RSH compound with said inorganic hydroxide to form a mercaptide and then simultaneously reacting said compound reactive with said $RS_nX$ and said inorganic sulfur halide with said mercaptide to produce the derivative of said $RS_nX$ compound.

3. In the process wherein a mercaptan having the formula RSH, wherein R contains from 1–20 carbon atoms selected from the group consisting of saturated acyclic, saturated alicyclic, and aryl radicals, an aqueous solution of an inorganic hydroxide, an inorganic sulfur halide and a compound reactive with an organic halide of the formula $RS_nX$ wherein $n$ is an integer selected from the group consisting of 2 and 3, X is a halogen, and R is as above defined, said compound reactive with said organic halide being selected from the group consisting of primary amines, secondary amines, metal xanthates, ammonium xanthates, metal and ammonium dithiocarbamates, metal and ammonium thiocarbonates, and metal and ammonium cyanides, are reacted together to form a derivative of said $RS_nX$, the improvement comprising the steps of first reacting said RSH compound with said inorganic hydroxide to form a mercaptide, then adding the mercaptide-containing reaction mixture to said compound reactive with said $RS_nX$ compound, and, finally adding said inorganic sulfur halide into the resulting reaction mixture to produce the derivative of said $RS_nX$ compound.

4. In the process wherein a mercaptan having the formula RSH, wherein R contains from 1–20 carbon atoms selected from the group consisting of saturated acyclic, saturated alicyclic, and aryl radicals, an aqueous solution of an inorganic hydroxide, an inorganic sulfur halide and a compound reactive with an organic halide of the formula $RS_nX$, wherein $n$ is an integer selected from the group consisting of 2 and 3, X is a halogen, and R is as above defined, said compound reactive with said organic halide being selected from the group consisting of primary amines, secondary amines, alkali metal and alkaline earth metal xanthates, ammonium xanthates, alkali metal and alkaline earth metal dithiocarbamates, ammonium dithiocarbamates, ammonium thiocarbonates, alkali metal and alkaline earth metal thiocarbonates, ammonium cyanides, and alkali metal and alkaline earth metal cyanides are reacted together to form a derivative of said $RS_nX$, the improvement comprising the steps of reacting said RSH compound with said inorganic hydroxide to form a mercaptide, then adding said compound reactive with said $RS_nX$ compound to said mercaptide thus formed, and, finally, adding said inorganic sulfur halide to the resulting reaction mixture to form the derivative of said $RS_nX$ compound.

5. In the process wherein an aqueous solution of an alkali metal hydroxide, tertiary butyl mercaptan, dimethylamine, and sulfur monochloride are reacted together at a temperature in the range of 0–250° F. to form N,N-dimethyl-tert-butyl dithiosulfenamide, the improvement comprising the steps of first reacting said aqueous alkali metal hydroxide with said tertiary butyl mercaptan to form tertiary butyl mercaptide, then adding said dimethylamine to the resulting mercaptide-containing reaction mixture, and, finally, adding said sulfur monochloride to the resulting mercaptide-amine mixture to form said N,N-dimethyl-tert-butyl dithiosulfenamide as product of the process.

References Cited in the file of this patent

UNITED STATES PATENTS

| | | |
|---|---|---|
| 2,520,401 | Himel et al. | Aug. 29, 1950 |
| 2,671,804 | Himel et al. | Mar. 9, 1954 |

OTHER REFERENCES

Parkes: Mellors Modern Inorganic Chemistry, p. 484 (1951).

Rheinboldt et al.: Berichte, vol. 72, pp. 657–670 (1939).